Patented Aug. 28, 1945

2,383,603

UNITED STATES PATENT OFFICE 2,383,603

CONDENSATION OF NITROALKANES WITH KETONES

Millard S. Larrison, La Fayette, and Henry B. Hass, West Lafayette, Ind., assignors to Purdue Research Foundation, La Fayette, Ind., a corporation of Indiana No Drawing. Application May 29, 1942, Serial No. 445,014

8 Claims. (Cl. 260—644)

This invention relates to the condensation of nitroalkanes with ketones. More particularly, it relates to the condensation of nitroalkanes with aliphatic and alicyclic ketones to produce dinitroalkanes and nitroolefins.

There has been considerable investigation and research, in recent years, with respect to this type of condensation reaction and the isolation of the products obtained thereby. For example, Fraser and Kon (J. of Chemical Society, 1934, 604) reported the condensation of cyclohexanone, acetone, and some homologous ketones with nitromethane by allowing the reacting materials to remain in contact with one another for from twelve to twenty-four hours in the presence of a catalyst. Some of the catalysts which these investigators tried were sodium ethoxide, piperidine, pyridine, methylamine, and metallic sodium. Of these, sodium ethoxide and piperidine were apparently the most efficacious. With the exception of cyclohexanone, all of the ketones tried were said to condense with two molecules of nitromethane to give a 1,3-dinitroalkane according to the equation:

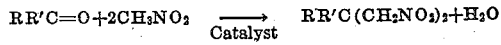

These investigators reported yields ranging from 15 to 25 per cent with acetone, diethyl, and methyl propyl ketones. Judging from the lack of success in attempts to duplicate Fraser and Kon's results, and the discrepancies between the physical properties of the compounds which they claimed to have obtained, and those obtained by us, the structure of which we have proved, it is evident that this disclosure is, at best, highly unsatisfactory and does not enable one skilled in the art to obtain such compounds, in the yields and state of purity that we are able to secure when effecting the above-indicated reaction in accordance with our invention.

We have found that by certain novel modifications of the reaction conditions described by Fraser and Kon, greatly increased yields of dinitroalkanes may be produced, together with good yields of nitroolefins. Furthermore, by regulating the proportions of the reactants and catalysts, and controlling the operating conditions we may change, as desired, the relative proportions of the dinitroalkanes and nitroolefins produced in the process. The respective conversions and yields of nitroolefins and dinitroalkanes were found to be affected by changes in the ratio of the reactants, the reaction temperature, the particular catalyst used, its concentration, and time of reaction. Other advantages of our improved process will be evident from the disclosure which follows.

We carry out our improved process by effecting condensation between a nitroalkane and an aliphatic or alicyclic ketone under anhydrous conditions at a temperature within the range of −30° C. to 70° C., depending upon the ketone and the catalyst used, as well as the reaction product desired, in the presence of a relatively high molar per cent concentration of a basic catalyst, such as an aliphatic amine. When the dinitroalkane is the principal product desired, an excess of nitroalkane should be employed, whereas an excess of the ketone results in the obtainment of increased amounts of the nitroolefin.

The reaction products are separated by first removing the low-boiling materials, and then if liquids at ordinary temperatures, rectifying the high boiling materials under reduced pressure; if the reaction products are solids at ordinary temperatures, the residue is chilled to facilitate crystallization of the dinitroalkane. Then the dinitroalkane is separated by filtration, and the nitroolefin recovered by rectifying the filtrate. Further purification of the solid dinitroalkane may be accomplished by recrystallization from methanol, and the liquid dinitroalkanes, by washing with a mineral acid, such as sulfuric, of moderate concentration, and distilling.

While the course of the condensation reaction between nitroalkanes and aliphatic ketones is not definitely known, we believe that the reaction proceeds in accordance with the manner shown by the following equations illustrating the reaction between nitromethane and diethyl ketone, in the presence of diethylamine:

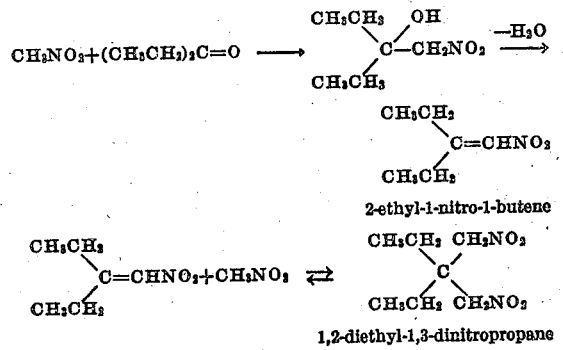

In this connection, diethyl ketone was used in the illustration since it is representative of the results obtained with aliphatic ketones in general; whereas, the methyl ketones are considered to constitute a class of particularly reactive ketones, giving some reactions not exhibited by the class of ketones to which diethyl ketone belongs.

According to the theory expressed by the above equations, the first step in the process of producing either dinitroalkanes or nitroolefins comprises condensing a nitroalkane with a ketone to give the nitroolefin. When the latter condenses with an additional equivalent of nitroalkane, the product is the dinitroalkane; however, the intermediate nitroolefin evidently is in equilibrium with the dinitroalkane and can be separated from the other reaction products, if desired. By increasing the ratio of the ketone to the nitroalkane, a higher proportion of nitroolefin will be obtained. Also, by conducting the reaction at a lower temperature there is a greater proportion of nitroolefin formed. The proportion of nitroolefin to dinitroalkane produced may also be varied by using different reaction times, shorter periods of reaction favoring greater proportions of nitroolefin. Thus it is seen that the respective proportions of the reaction products may be readily modified by changing the ratio of the reactants, as well as other factors. Although the proportions of each product actually obtained in any particular case are primarily dependent upon the ratio of the reactants, they are also affected to a large extent by certain other factors discussed in detail below.

Although the reaction can be effected with ratios of the ketone varying from one-tenth to twenty moles per mole of nitroalkane, the actual ratio of ketone to nitroalkane employed in any given case depends partly on the desired ratio of the reaction products. If the dinitroalkane is desired, the ratio should not generally exceed one to one, and for most satisfactory results should be of the order of one mole of ketone to three or four moles of nitroalkane. Furthermore, with ratios of nitroalkane to ketone substantially above four to one, the yields actually decrease, presumably because the side reactions resulting from the effect of the alkaline catalysts upon the dinitroalkane becomes of a greater order of magnitude, as well as the side reactions resulting from the reaction of liberated water with the nitroalkane.

Although it has been previously stated that 1,3-dinitroalkanes could be produced by condensing ketones with nitroalkanes at room temperature, the yields thus obtained were quite low. We have found that by effecting the condensations for longer periods of time and with higher concentrations of catalysts, substantially higher conversions and yields are obtained. For example, with a two to one molar ratio of nitromethane to diethyl ketone, experimental results clearly indicate that up to a one to one ratio of diethylamine to diethyl ketone, the reaction rate at room temperature is proportional to the molar ratio of catalyst to ketone. Thus, one mole of amine per mole of ketone will give approximately the same conversion in seven days as is obtained with five-tenths mole of amine per mole of ketone in fourteen days. Similarly, one-fourth mole of amine per mole of ketone gives one-half the conversion obtainable by the use of five-tenths mole of amine per mole of ketone when both are allowed to react for fourteen days, as shown in Table I appearing below:

Table I

| Nitromethane, moles | Diethyl-ketone, moles | Diethylamine catalyst, moles | Reaction time, days | Conversion to 2,2-diethyl-1,3-dinitropropane | |
|---|---|---|---|---|---|
| | | | | Grams | Percent |
| 2 | 1 | 1 | 7 | 38 | 20 |
| 2 | 1 | 0.5 | 14 | 41.2 | 21.6 |
| 2 | 1 | 0.25 | 14 | 19.2 | 10.1 |

We have found that amines which form a homogeneous solution with the reactants and which have basic dissociation constants in excess of $1\times10^{-7}$ are the most effective catalysts. It should be noted, however, that the secondary amines ordinarily give better results than the tertiary or primary amines. Piperidine was found to be the most active catalyst on a molar basis; dimethylamine, however, was found to be a much more efficient catalyst on a weight basis. Examples of suitable catalysts are: dimethylamine, trimethylamine, n-butylamine, dibutylamine, tributylamine, diamylamine, piperidene, piperazine, morpholine, etc. We have found it advantageous to use in excess of twenty mole per cent of catalyst, in order to obtain satisfactory results.

The rate of reaction for a particular ratio of the reactants will vary with the concentration of catalyst and the concentration of catalyst will vary according to the particular catalyst used. For example, when reacting nitromethane with diethyl ketone in a molar ratio of two to one, using dimethylamine as a catalyst, the maximum rate of reaction occurred with a ratio of one and five-tenths to two moles of the amine per mole of nitromethane; whereas, with diethylamine the molar ratio was one mole of the amine per mole of nitromethane. Satisfactory results were obtained, however, with both smaller and larger ratios; and insofar as we have obtained complete recovery of the amine, the economic factor of using larger concentrations of the catalyst is of little or no importance.

Satisfactory reactions occur with catalyst concentrations in excess of twenty mole per cent, based on the weight of nitroalkane, employing temperatures that may vary from $-30°$ C. to $70°$ C., but the preferred temperature range is from $-10°$ to $20°$ C. Below a temperature of $-10°$ C. the reaction proceeds slowly, although the yields are good. At temperatures ranging above $20°$ C., however, the rate of reaction is increased, with a corresponding decrease in the yield of nitroolefin and dinitroalkane. Furthermore, at higher temperatures side reactions take place which give rise to the formation of polymeric products of undetermined structure.

The time required for maximum conversion in any particular instance will depend, of course, upon the temperature at which the reaction is effected. With relatively higher molar concentrations of the more active catalysts, such as dimethylamine, at room temperature, excellent results were obtained in twenty-four to seventy-two hours, although substantial conversions were observed to occur in shorter periods of time. It has been found that the conversion actually decreases if the reaction is allowed to run too long. This behavior is thought to be due to polymerization of the nitroolefin, to a resinous material. For example, in the reaction of a two to one to one mole ratio of nitromethane to diethyl ketone to diethylamine at room temperature, the maximum conversion was obtained in fifteen days; thereafter the conversion decreased. It should be noted, however, that if the desired product is the nitroolefin, lower temperatures and a less active catalyst, or shorter reaction periods should be employed. For example, at −20° C. to −16° C. the reactions are much slower than at 0° C., but the ratio of nitroolefin to dinitro compound is much higher.

A difficulty that arises in lengthy periods of reaction and also when the conversion becomes high in shorter periods of reaction, is the side reactions between the liberated water and nitroalkane. Hence it is advantageous to effect the condensation in the presence of a drying agent, being careful to select one that does not react with the catalyst, the reactants, and the reaction products. For this purpose, we have found that Drierite (anhydrous calcium sulfate) is very satisfactory.

The following examples will illustrate our improved method of producing dinitroalkanes and nitroolefins, it being strictly understood, however, that we are not limited to the specific procedures herein set forth, but include within the scope of our invention the usual equivalents.

Example I

A mixture of 61 parts of nitromethane, 21.5 parts of diethyl ketone, and 43 parts of dimethylamine was allowed to stand at 0-5° C. for seven days in the presence of 30 parts of anhydrous calcium sulfate. At the end of this reaction period the low-boiling materials were removed by distillation at reduced pressure. The residue from this distillation was chilled and filtered, thus separating a large percentage of the dinitro compound from the filtrate. The filtrate was rectified at 10 mm. pressure and the 2-ethyl-1-nitro-1-butene recovered at 62.2–62.8° C. This residue was treated with methanol, chilled and filtered, thereby yielding 2,2-diethyl-1,3-dinitropropane. Seventy-three per cent of the ketone was converted to 2,2-diethyl-1,3-dinitropropane, while eleven per cent was converted to 2-ethyl-1-nitro-1-butene.

The following table gives a summary of the results utilizing 0°–5° C., for the reaction temperature. The particular advantage of this reaction temperature is that a relatively small amount of resinous product is formed, thereby facilitating the separation of the reaction products. These results show that for the same proportion of reactants, concentration of catalyst and reaction temperature, a shorter period of reaction yields higher proportions of nitroolefins as illustrated by comparing experiments one and five; and, as seen by comparing experiments four and eight, lower temperatures favor higher proportions of nitroolefin, but the reaction is slower.

Table II

| Nitromethane, moles | Diethylketone, moles | Dimethylamine catalyst, moles | Reaction time, hours | Temperature 0° C. | Percent conversion based on ketone | |
|---|---|---|---|---|---|---|
| | | | | | Dinitroalkane [1] | Nitroolefin [2] |
| 0.5 | 0.25 | 0.5 | 168 | 0– 5 | 51 | 26 |
| 0.5 | 0.12 | 0.5 | 168 | 0– 5 | 73 | 11 |
| 0.25 | 0.12 | 0.5 | 168 | 0– 5 | 50 | 15 |
| 1.5 | 0.5 | 1.5 | 168 | 0– 5 | 69 | 17 |
| 0.5 | 0.25 | 0.5 | 67 | 0– 5 | 23 | 45 |
| 0.25 | 0.25 | 0.25 | 67 | 0– 5 | 8.8 | 34 |
| 0.12 | 0.25 | 0.12 | 67 | 0– 5 | 2.7 | 16 |
| 0.5 | 0.17 | 0.5 | 67 | −20– −16 | 0.9 | 11.6 |

[1] 2,2-diethyl-1,3-dinitropropane.
[2] 2-ethyl-1-nitro-1-butene.

Example II 2,2-diethyl-1,3-dinitropropane and 2-ethyl-1-nitro-1-butene were prepared by reacting 30.5 parts of nitro-methane, 21.5 parts of diethyl ketone, and 22.5 parts of dimethylamine in the presence of 20 parts of calcium sulfate at room temperature for forty-eight hours. At the end of this time the low-boiling materials were removed by distillation at reduced pressure, after which the residue was chilled, filtered, and the reaction products separated as in Example I.

The yield of 2,2-diethyl-1,3-dinitropropane was the only one calculated, and was found to be 48.6 per cent based on the ketone.

The following table shows the results obtained at room temperature. The results indicate that the best conversion to dinitroalkane is obtained with the ratio of catalyst being of the order of one and one-half to two moles per mole of nitromethane.

Table III

| Nitromethane, moles | Diethylketone, moles | Catalyst dimethylamine, moles | Reaction time, hours | Percent conversion to dinitroalkane [1] based on ketone |
|---|---|---|---|---|
| 0.5 | 0.25 | 1.0 | 67 | 60.2 |
| 0.5 | 0.25 | 0.5 | 67 | [2] 48.5 |
| 1.0 | 0.5 | 1.5 | 67 | 58.0 |
| 0.5 | 0.25 | 0.5 | 48 | 48.6 |

[1] 2,2-diethyl-1,3-dinitropropane.
[2] Incomplete recovery.

In both of the experiments mentioned above, approximately 10 to 20 per cent of the dinitroalkane formed was left in the oily filtrate and the methanol used in washing the crude product. It is possible to obtain a higher yield of the dinitro compound by subjecting a mixture of the oily filtrate and the wash methanol to agitation with warm fifty per cent sulfuric acid, diluting the filtrate with water and cooling, after which the acid solution is filtered and an additional amount of the dinitroalkane obtained. The dinitroalkane recovered in this manner should be washed, dried, dissolved in hot methanol, treated with decolorizing carbon, filtered, and the filtrate chilled. After this treatment the dinitroalkane is recovered by filtration.

If the dinitroalkane is the product desired, the filtrate containing nitroolefin and the distillate containing the low-boiling material, consisting of nitroolefin, ketone, nitromethane, and amine, may be further reacted with or without additional nitromethane and amine, depending upon original proportions, to give additional amounts of the dinitroalkane.

In place of the diethyl ketone mentioned in the examples, we have substituted other ketones, such as ethyl butyl ketone, methyl isobutyl ketone, and cyclohexanone, to obtain the corresponding dinitro compounds and nitroolefins. Also, nitroparaffins such as nitroethane, nitropropane, nitrobutane, and the like may be substituted for the nitromethane mentioned in the example.

The same procedure as described in Example II has been used substituting acetone for the diethyl ketone. In this particular reaction, a nitro ketone was formed, but no nitroolefin. The products obtained in this reaction were 2,2-dimethyl-1,3-dinitropropane and 4,4-dimethyl-5-nitro-2-pentanone. The data appearing below in tabular form show the results obtained by reacting nitromethane with acetone in varying proportions in the presence of different amounts of catalyst.

*Table IV*

| Room temperature rapid reaction | | Catalyst, moles | Reaction time, hrs. | Percent conversion of acetone to— | |
|---|---|---|---|---|---|
| Nitromethane, moles | Acetone, moles | | | Dinitroalkane [1] | Nitroketone [2] |
| 0.5 | 0.25 | Et$_2$NH......0.25 | 24 | 42 | |
| 1.0 | 0.5 | Piperidine...0.5 | 24 | 65 | 10 |
| 2.0 | 1.0 | Et$_2$NH......1.0 | 54 | 62.5 | 8.8 |
| 1.0 | 1.5 | Et$_2$NH......0.5 | 48 | 58 | 8.8 |
| 1.0 | 0.5 | Me$_2$NH......0.5 | 42 | 57 | 8.8 |

[1] 2,2-dimethyl-1,3-dinitropropane.
[2] 4,4-dimethyl-5-nitro-2-pentanone.

Now having described our invention, what we claim is:

1. In a process for the condensation of a nitroalkane with a ketone of the group consisting of aliphatic ketones and alicyclic ketones to produce the corresponding dinitrohydrocarbon, the step which comprises effecting said condensation in the presence of in excess of 20 mole per cent of a secondary amine based on the weight of the nitroalkane at a temperature below room temperature for a period of time exceeding 12 hours, said amine having a basic dissociation constant in excess of $1 \times 10^{-7}$.

2. In a process for the condensation of a nitroalkane with a ketone of the group consisting of aliphatic ketones and alicyclic ketones to produce the corresponding dinitrohydrocarbon, the step which comprises effecting said condensation at a temperature below room temperature in the presence of in excess of 20 mole per cent of a secondary amine based on the weight of the nitroalkane, said amine having a basic dissociation constant in excess of $1 \times 10^{-7}$ and a drying agent which is inactive to the amine, reactants, and reaction products.

3. In a process for the condensation of a nitroalkane with a ketone of the group consisting of aliphatic ketones and alicyclic ketones to produce the corresponding dinitrohydrocarbon, the step which comprises effecting said condensation in the presence of in excess of 20 mole per cent of a secondary amine based upon the weight of the nitroalkane, wherein the molar ratio of nitromethane to ketone is above 0.1 but below 20, said amine having a basic dissociation constant in excess of $1 \times 10^{-7}$.

4. In a process for the condensation of a lower nitroalkane with a ketone of the group consisting of aliphatic ketones and alicyclic ketones to produce the corresponding dinitrohydrocarbon, the step which comprises effecting said condensation at a temperature above $-30°$ C., but below $70°$ C., in the presence of in excess of 20 mole per cent of a secondary amine based on the weight of the nitroalkane, said amine having a basic dissociation constant in excess of $1 \times 10^{-7}$, and a drying agent which is inactive to the amine, reactants, and reaction products.

5. In a process for the production of dinitroalkanes from mononitro alkanes and ketones selected from the group consisting of alicyclic and aliphatic ketones, the step which comprises bringing into reaction a ketone of the aforesaid type with a mononitroalkane in a ratio of 1 to 4 moles of nitroalkane per mole of ketone in the presence of in excess of 20 mole per cent of a secondary amine as a catalyst for the reaction, based on the weight of the nitroalkane, said amine having a dissociation constant in water which is greater than $1 \times 10^{-7}$.

6. The process of claim 5 in which the reaction is carried out at a temperature above $-10°$ C. but below $20°$ C.

7. In a process for the production of 2,2-dimethyl-1,3-dinitropropane, the step which comprises bringing into reaction acetone with nitromethane in a ratio of from 1 to 4 moles of nitromethane per mole of acetone in the presence of in excess of 20 mole per cent of a secondary amine, based on the weight of the nitromethane, said amine having a dissociation constant in water which is greater than $1 \times 10^{-7}$.

8. In a process for the production of 2,2-diethyl-1,3-dinitropropane, the step which comprises bringing into reaction diethyl ketone with nitromethane in a ratio of from 1 to 4 moles of nitromethane per mole of diethyl ketone in the presence of in excess of 20 mole per cent of a secondary amine, based on the weight of nitromethane, said amine having a dissociation constant in water which is greater than $1 \times 10^{-7}$.

MILLARD S. LARRISON.
HENRY B. HASS.